(12) United States Patent
Matsumoto et al.

(10) Patent No.: US 10,549,672 B2
(45) Date of Patent: Feb. 4, 2020

(54) VEHICLE SEAT

(71) Applicants: HONDA MOTOR CO., LTD., Minato-ku, Tokyo (JP); TS TECH CO., LTD., Asaka-shi, Saitama (JP)

(72) Inventors: Manabu Matsumoto, Wako (JP); Nobuo Yokochi, Wako (JP); Masaya Furuta, Tochigi (JP); Shoko Saito, Tochigi (JP); Heehyeok Park, Tochigi (JP)

(73) Assignees: Honda Motor Co., Ltd., Tokyo (JP); TS Tech Co., Ltd., Shioya-Gun, Tochigi (JP)

( * ) Notice: Subject to any disclaimer, the term of this patent is extended or adjusted under 35 U.S.C. 154(b) by 0 days.

(21) Appl. No.: 16/155,239

(22) Filed: Oct. 9, 2018

(65) Prior Publication Data
US 2019/0111823 A1   Apr. 18, 2019

(30) Foreign Application Priority Data
Oct. 12, 2017  (JP) ................. 2017-198550

(51) Int. Cl.
| *B60N 3/10* | (2006.01) |
| *B60N 3/06* | (2006.01) |
| *B60N 2/20* | (2006.01) |
| *B60N 2/90* | (2018.01) |

(52) U.S. Cl.
CPC .............. *B60N 3/101* (2013.01); *B60N 2/995* (2018.02)

(58) Field of Classification Search
CPC ................. B60N 2/995; B60N 3/101

USPC ....................... 297/188.14–188.21
See application file for complete search history.

(56) References Cited

U.S. PATENT DOCUMENTS

| 3,637,184 A | * | 1/1972 | O'Brien | A47C 7/70 |
| | | | | 297/188.17 X |
| 4,040,659 A | * | 8/1977 | Arnold | A47B 31/06 |
| | | | | 297/188.17 |
| 4,410,215 A | * | 10/1983 | McKean | B60N 2/995 |
| | | | | 297/423.19 |
| 4,417,764 A | * | 11/1983 | Marcus | B60N 2/793 |
| | | | | 297/188.17 |

(Continued)

FOREIGN PATENT DOCUMENTS

| DE | 19529877 A1 | * | 2/1997 | ............ B60N 3/101 |
| JP | H08127279 A | | 5/1996 | |
| JP | 11348641 A | * | 12/1999 | ............ B60N 3/101 |

*Primary Examiner* — Rodney B White
(74) *Attorney, Agent, or Firm* — Armstrong Teasdale LLP

(57) ABSTRACT

Provided is a vehicle seat fitted with a cup holder that includes a support wire member (41) including a pair of longitudinal portions (45) having base ends attached to either side of a side frame and extending in a forward direction, and a cross portion (46) extending between free ends of the longitudinal portions, a housing member (42) having a pair of side walls (47, 48), a front wall (49) extending between front edges of the side walls, and side flanges (51, 52) formed in lower edges of the side walls, the side flanges resting on the longitudinal portions of the support wire member, and a cup shaped container receiving member (60) having an open top and received in the housing member, a bottom end of the container receiving member being provided with a pair of engagement features (61) that are engaged by the longitudinal portions of the support wire member.

14 Claims, 13 Drawing Sheets

(56) References Cited

U.S. PATENT DOCUMENTS

Figure 1:
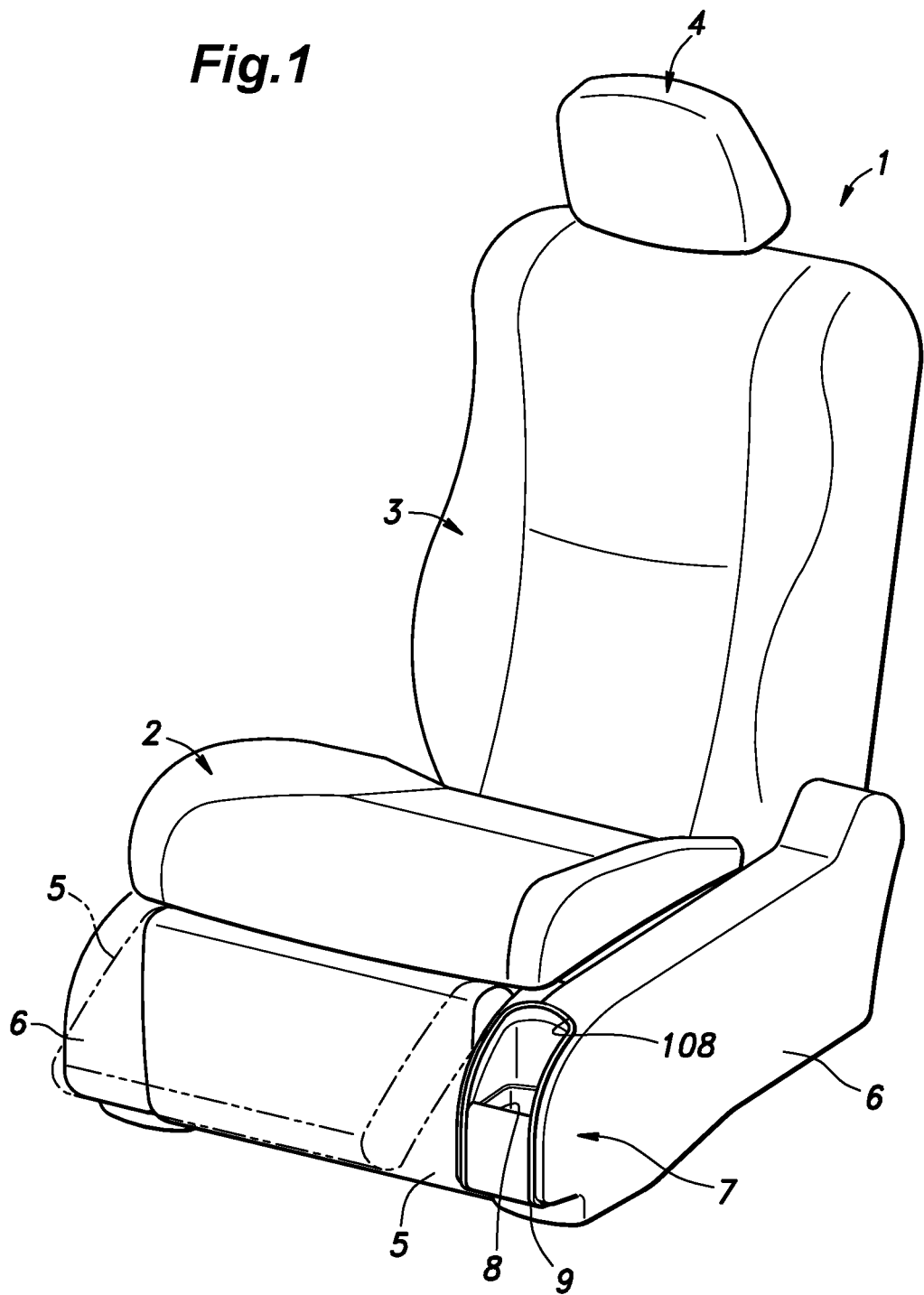

| | | | | |
|---|---|---|---|---|
| 4,733,908 A * | 3/1988 | Dykstra | B60N 3/102 | 297/188.16 X |
| 4,783,037 A * | 11/1988 | Flowerday | B60N 3/102 | 297/188.17 X |
| 4,828,211 A * | 5/1989 | McConnell | B60N 3/102 | 297/188.2 X |
| 4,928,865 A * | 5/1990 | Lorence | B60N 3/102 | 297/188.16 X |
| 5,054,733 A * | 10/1991 | Shields | B60N 3/101 | 248/154 |
| 5,072,989 A * | 12/1991 | Spykerman | A47C 7/62 | 297/188.16 |
| 5,171,061 A * | 12/1992 | Marcusen | B60N 3/102 | 297/188.17 |
| 5,195,711 A * | 3/1993 | Miller | A47C 7/70 | 297/188.16 X |
| 5,248,183 A * | 9/1993 | Gignac | B60N 2/793 | 297/188.16 |
| 5,259,579 A * | 11/1993 | Schneider | B60N 2/793 | 297/188.16 X |
| 5,316,368 A * | 5/1994 | Arbisi | B60N 2/793 | 297/188.19 |
| 5,330,146 A * | 7/1994 | Spykerman | B60N 3/102 | 297/188.17 X |
| 5,427,447 A * | 6/1995 | Satoh | B60N 3/102 | 297/188.17 X |
| 5,524,958 A * | 6/1996 | Wieczorek | A47C 7/70 | 297/188.17 |
| 5,613,732 A * | 3/1997 | Demick | B60N 2/793 | 297/188.16 |
| 5,628,486 A * | 5/1997 | Rossman | B60N 3/102 | 297/188.19 X |
| 5,673,891 A * | 10/1997 | Fujihara | B60N 3/102 | 297/188.17 X |
| 5,692,718 A * | 12/1997 | Bieck | B60N 3/102 | 297/188.17 X |
| 5,722,726 A * | 3/1998 | Matsumiya | B60N 2/242 | 297/322 |
| 5,791,616 A * | 8/1998 | Volkmann | B60N 3/102 | 297/188.15 X |
| 5,800,011 A * | 9/1998 | Spykerman | B60N 3/106 | 297/188.14 X |
| 6,019,334 A * | 2/2000 | Shinomiya | B60N 3/102 | 297/188.14 X |
| 6,036,152 A * | 3/2000 | Hiscox | B60N 3/102 | 297/188.17 X |
| 6,065,729 A * | 5/2000 | Anderson | B60N 3/102 | 297/188.15 X |
| 6,105,917 A * | 8/2000 | Yabuya | B60N 3/102 | 297/188.17 X |
| 6,349,913 B1 * | 2/2002 | Jankowski | B60N 3/102 | 297/188.17 X |
| 6,412,870 B1 * | 7/2002 | Higgins | B60N 2/34 | 297/342 |
| 6,427,960 B1 * | 8/2002 | Gehring | B60N 3/102 | 297/188.14 X |
| 6,485,097 B1 * | 11/2002 | Yuzawa | B60N 3/102 | 297/188.21 X |
| 6,520,575 B1 * | 2/2003 | Yuzawa | B60N 3/102 | 297/188.19 X |
| 6,672,554 B2 * | 1/2004 | Fukuo | B60N 3/102 | 297/188.19 X |
| 7,597,300 B2 * | 10/2009 | Harada | A47G 23/0225 | 297/188.14 X |
| 8,360,380 B2 * | 1/2013 | Soma | B60N 3/101 | 224/926 |
| 8,807,504 B2 * | 8/2014 | Ogawa | B60N 3/106 | 297/188.14 X |
| 8,911,011 B2 * | 12/2014 | Andersson | B60N 3/102 | 297/188.14 |
| 8,944,499 B2 * | 2/2015 | Oh | B60N 2/5635 | 297/188.14 X |
| 9,284,055 B2 * | 3/2016 | Beroth | B60N 2/2209 | |
| 9,446,690 B2 * | 9/2016 | Shigematsu | B60N 2/995 | |
| 2002/0101106 A1 * | 8/2002 | Kim | B60N 2/0224 | 297/362.11 |
| 2003/0209933 A1 * | 11/2003 | Flory | B60N 2/995 | 297/423.36 |
| 2005/0173948 A1 * | 8/2005 | Boehmer | B60N 2/995 | 297/69 |
| 2006/0119145 A1 * | 6/2006 | Stahel | A47C 7/68 | 297/188.16 |
| 2007/0102985 A1 * | 5/2007 | Taniguchi | B60N 2/995 | 297/423.36 |
| 2009/0014611 A1 * | 1/2009 | Hampton | A47C 7/68 | 297/188.2 X |
| 2009/0115230 A1 * | 5/2009 | Haut | B60N 2/2866 | 297/188.16 |
| 2012/0075842 A1 * | 3/2012 | Goto | B60N 3/101 | 362/154 |
| 2013/0038097 A1 * | 2/2013 | Oldani | B60N 3/102 | 297/188.14 |
| 2014/0225400 A1 * | 8/2014 | Nagayasu | A47C 1/0342 | 297/75 |
| 2015/0314713 A1 * | 11/2015 | Thomaschewski | B60N 3/103 | 297/188.16 |
| 2016/0318426 A1 * | 11/2016 | Aita | B60N 2/3013 | |
| 2018/0281643 A1 * | 10/2018 | Umezawa | B60N 2/5825 | |
| 2018/0290566 A1 * | 10/2018 | Sera | B60N 2/995 | |
| 2018/0339628 A1 * | 11/2018 | Kimura | B60N 2/995 | |
| 2019/0168644 A1 * | 6/2019 | Kim | B60N 2/34 | |

* cited by examiner

VEHICLE SEAT

TECHNICAL FIELD

The present invention relates to a vehicle seat fitted with a cup holder.

BACKGROUND ART

In a known vehicle seat, the seat cushion of the seat is formed with a cushion recess in an upper surface thereof, and a cushion member is fitted into this cushion recess in a vertically reversible manner. The rear side of the cushion member is formed with a receiving recess configured to receive a beverage container while the front side of the cushion member is flush with the remaining part of the upper surface of the seat cushion so that the cushion member may be used for retaining a beverage container when the rear side of the cushion member faces upward, and may define a part of the upper surface of the seat cushion when the front side of the cushion member faces upward. See JPH8-127279A, for instance.

In this arrangement, since the cushion member is fitted into the seat cushion which is soft and readily deformable, the beverage container may not be supported in a stable manner.

SUMMARY OF THE INVENTION

In view of such a problem of the prior art, a primary object of the present invention is to provide a vehicle seat which can retain and support a beverage container in a stable manner.

To achieve such an object, the present invention provides a vehicle seat (1) including a seat cushion (2) and a seat back (3) connected to a rear end of the seat cushion via a reclining mechanism (R), comprising: a pair of side frames (11) extending along either side of the seat cushion; and a cup holder (7) provided in a front end part of one of the side frames; wherein the cup holder includes a support wire member (41) including a pair of longitudinal portions (45) having base ends attached to either side of the corresponding side frame and extending in a forward direction, and a cross portion (46) extending between free ends of the longitudinal portions, a housing member (42) having a pair of side walls (47, 48), a front wall (49) extending between front edges of the side walls, and side flanges (51, 52) formed in lower edges of the side walls, the side flanges resting on the longitudinal portions of the support wire member, and a cup shaped container receiving member (60) having an open top and received in the housing member, a bottom end of the container receiving member being provided with a pair of engagement features (61) that are engaged by the longitudinal portions of the support wire member.

The container receiving member is supported by the side frame via the support wire member so that the container receiving member can be firmly secured to the side frame by using a highly simple structure. Since the support wire member is attached to the two sides of the side member, the container receiving member can be retained firmly, and the side member is prevented from receiving an undue force even when the container receiving member is subjected to a significant loading.

Preferably, main parts of the longitudinal portions are downwardly offset relative to the respective base ends of the longitudinal portions, and extend substantially horizontally.

Thereby, the container receiving member can be positioned in a relatively low part of the seat cushion so that the cup holder can retain a beverage container at a height which is convenient for the seat occupant.

Preferably, the cup holder further includes a protective wire member (43) including a pair of vertical portions (56) having lower ends attached to the respective side walls of the housing member and extending upward, and a lateral portion (57) extending between upper ends of the vertical portions, the lateral portion being fixedly attached to an upper extension (27, 28) of the corresponding side frame.

Thereby, the container receiving member can be secured to the side frame in an even more firm manner.

According to a preferred embodiment of the present invention, the vehicle seat is provided with a pan frame (P) which is supported by the side frames via a link mechanism (13, 15, 16) configured to move the pan frame in synchronism with a tilting motion of the seat back, the upper extension of the side frame provided with the cup holder being provided with a pivot point for the link mechanism.

Thereby, the protective wire member may consist of a highly compact member, and can be attached to the side frame in a highly firm manner.

Preferably, a front flange (53) is formed in a lower edge of the front wall, the front flange resting on the cross portion (46) of the support wire member.

Thereby, the container receiving member can be secured to the side frame in an even more stable manner.

In a particularly preferred embodiment of the present invention, the side frame provided with the cup holder includes an outer frame part (21) consisting of a sheet member having a major plane facing sideways, and an inner frame part (22) also consisting of a sheet member having a major plane facing sideways and attached to an inner side of the outer frame part, the outer side wall of the housing member being located more outward than the outer frame part, and the inner side wall of the housing member being located more inward than the inner frame part.

Thereby, the side frame is given with a high bending stiffness by using a minimum amount of material, and is enabled to support the cup holder in a highly stable manner.

Preferably, a lateral center of the housing member is offset inward relative to a lateral center of the side frame provided with the cup holder.

Thereby, the housing member or the cup holder can be prevented from unduly protruding laterally from the side frame so that the seat occupant is prevented from being obstructed by the cup holder when getting into and out of vehicle seat.

The vehicle seat may further comprise a retractable ottoman (6) on a front side of the seat cushion, a front profile of the cup holder being located behind a front profile of the ottoman in a retracted state in side view.

In such a case, the cup holder can be positioned so as to be least obtrusive to the seat occupant.

The vehicle seat may further comprise an outer cover (71) covering an outer side of the side frame provided with the cup holder, an inner cover (72) covering a front part of an inner side of the side frame, and a front cover (125) extending between front edges of the outer cover and the inner cover, an opening (108) exposing the open top of the container receiving member being defined by the front edges of the outer cover and the inner cover and an upper edge of the front cover.

Thereby, a cover for covering the side frame and the reclining mechanism can be formed in a highly simple manner, and the external appearance of the seat can be enhanced. Furthermore, the assembling of the cover is simplified.

The vehicle seat may further comprise a decorative member (110) including a frame part (111) extending along the front edges of the outer cover and the inner cover, and a plate part (112) extending between lower ends of the frame part and interposed between the front wall of the housing member and the front cover.

The frame part covers the upper edge of the container receiving member, and conceals a gap that may be created between the upper edge of the container receiving member and the front edges of the inner cover and the outer cover so that the external appearance of the cup holder can be enhanced.

Preferably, the plate part of the decorative member is provided with a cross piece (113) engaged by a tongue piece (117) projecting upward from a part of the front wall of the housing member, and the front cover is attached to the plate part via a snap fit arrangement (126, 127).

Thereby, the decorative member and the front cover can be attached to the side frame both easily and firmly.

Preferably, lower parts of the front edges of the outer cover and the inner cover are recessed rearward with respect to remaining parts of the front edges of the outer cover and the inner cover.

Thereby, the reclining cover formed by the outer cover and the inner cover is prevented from hindering the seat occupant getting into and out of the seat.

Preferably, an upper edge of the front wall is bent rearward above a front edge of the open top of the container receiving member, and the upper edge of the front cover is wrapped around the upper edge of the front wall.

Thereby, the beverage container received in the container receiving member is prevented from tilting forward in an effective manner. The upper edge of the front cover enhances the external appearance of the open top of the container receiving member.

Preferably, at least a bottom part of the container receiving member is provided with an inner lining made of relatively soft material.

Thereby, the beverage container received in the container receiving member is protected from damages, and is prevented from rattling therein.

The present invention thus provides a vehicle seat which can retain and support a beverage container in a stable manner.

BRIEF DESCRIPTION OF THE DRAWING(S)

Figure 2:
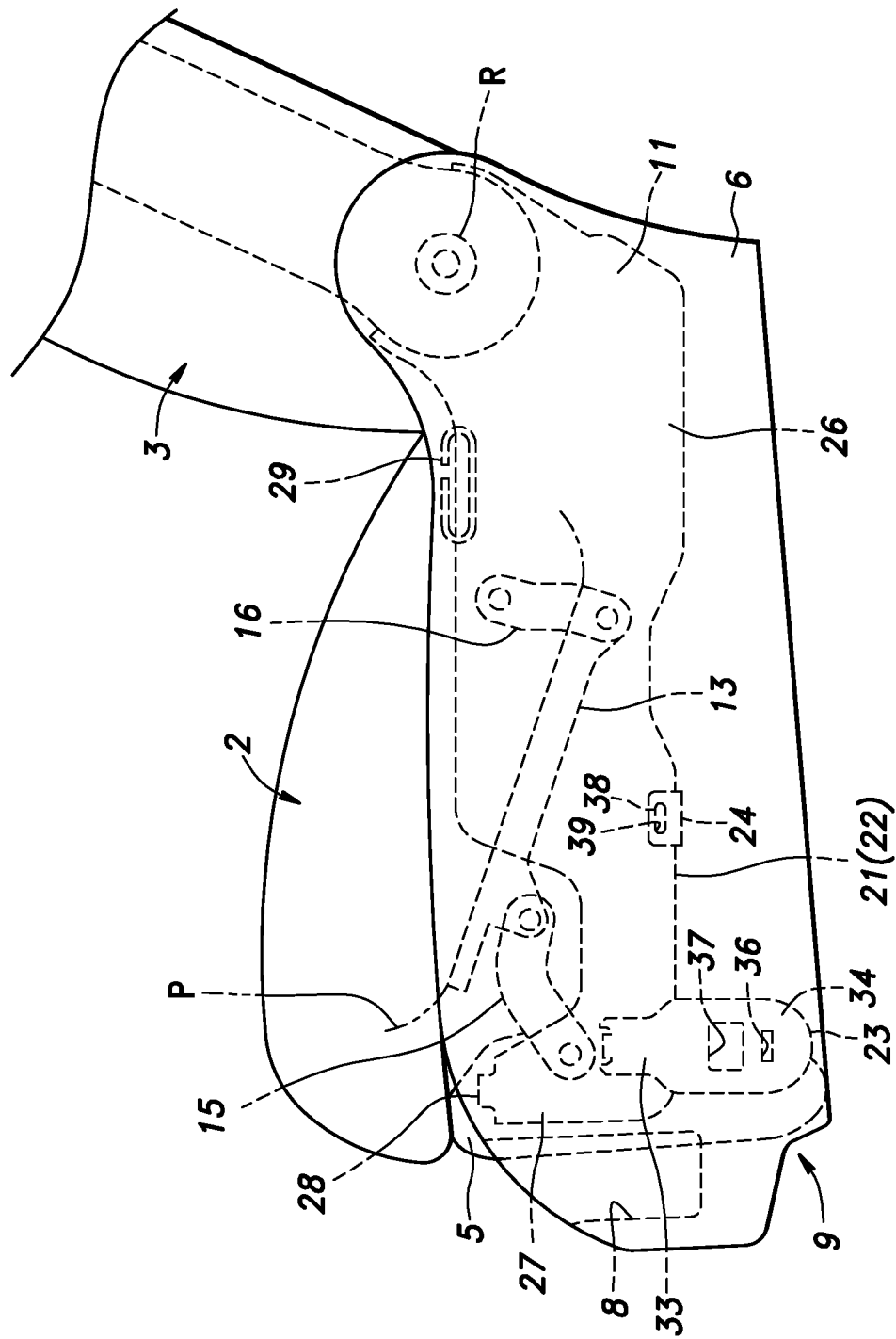
Figure 3:
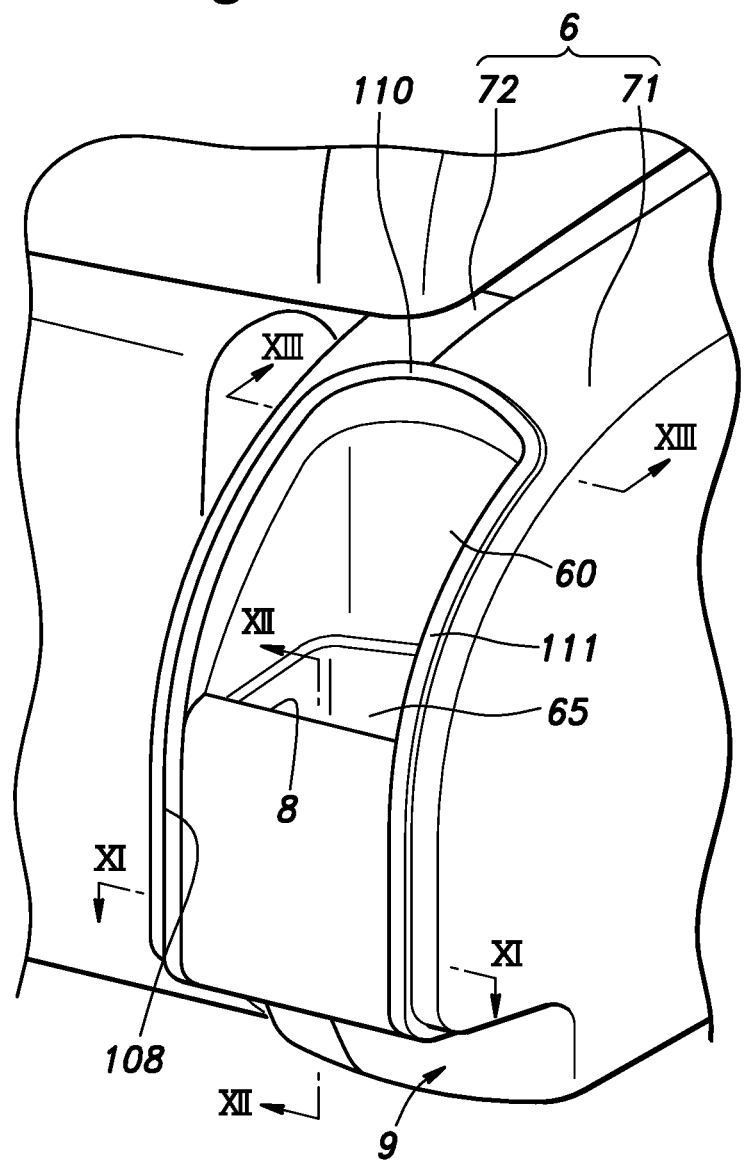
Figure 4:
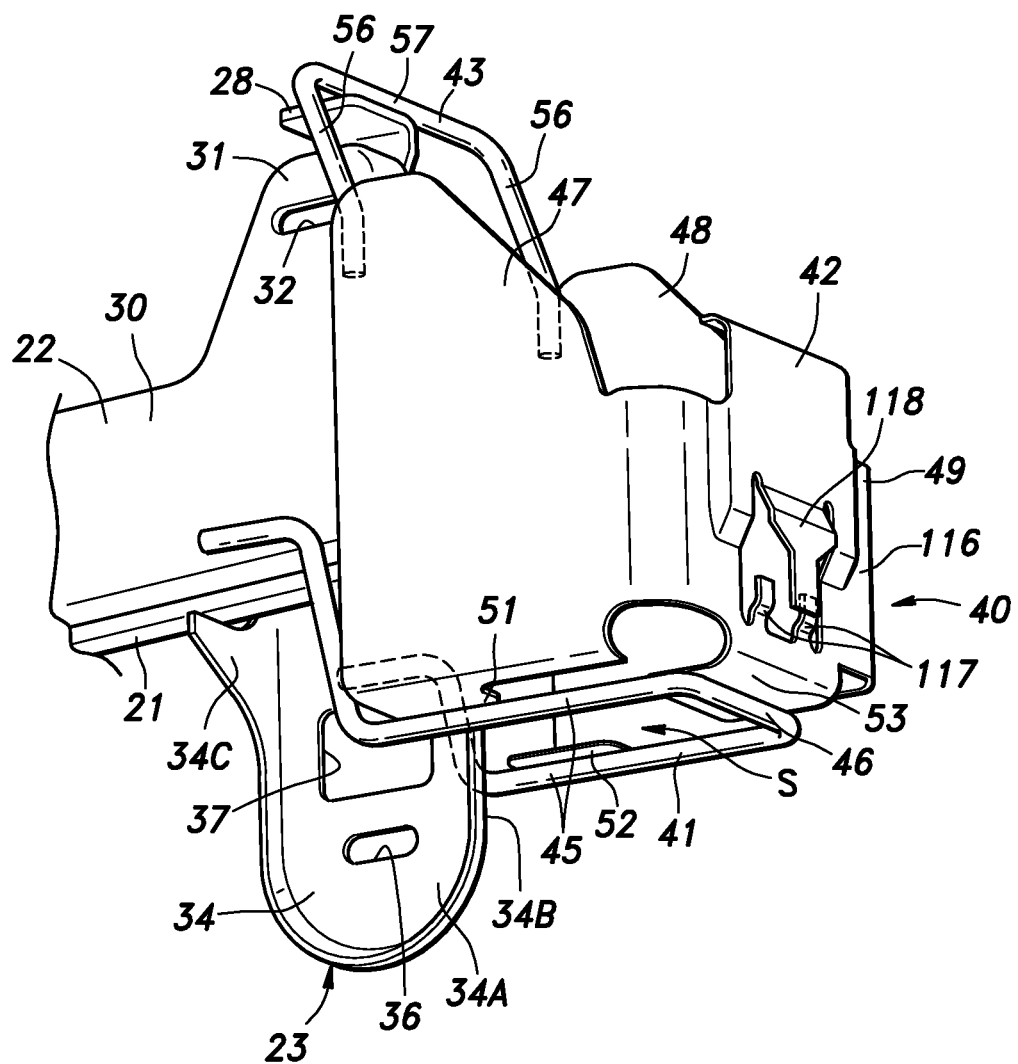
Figure 5:
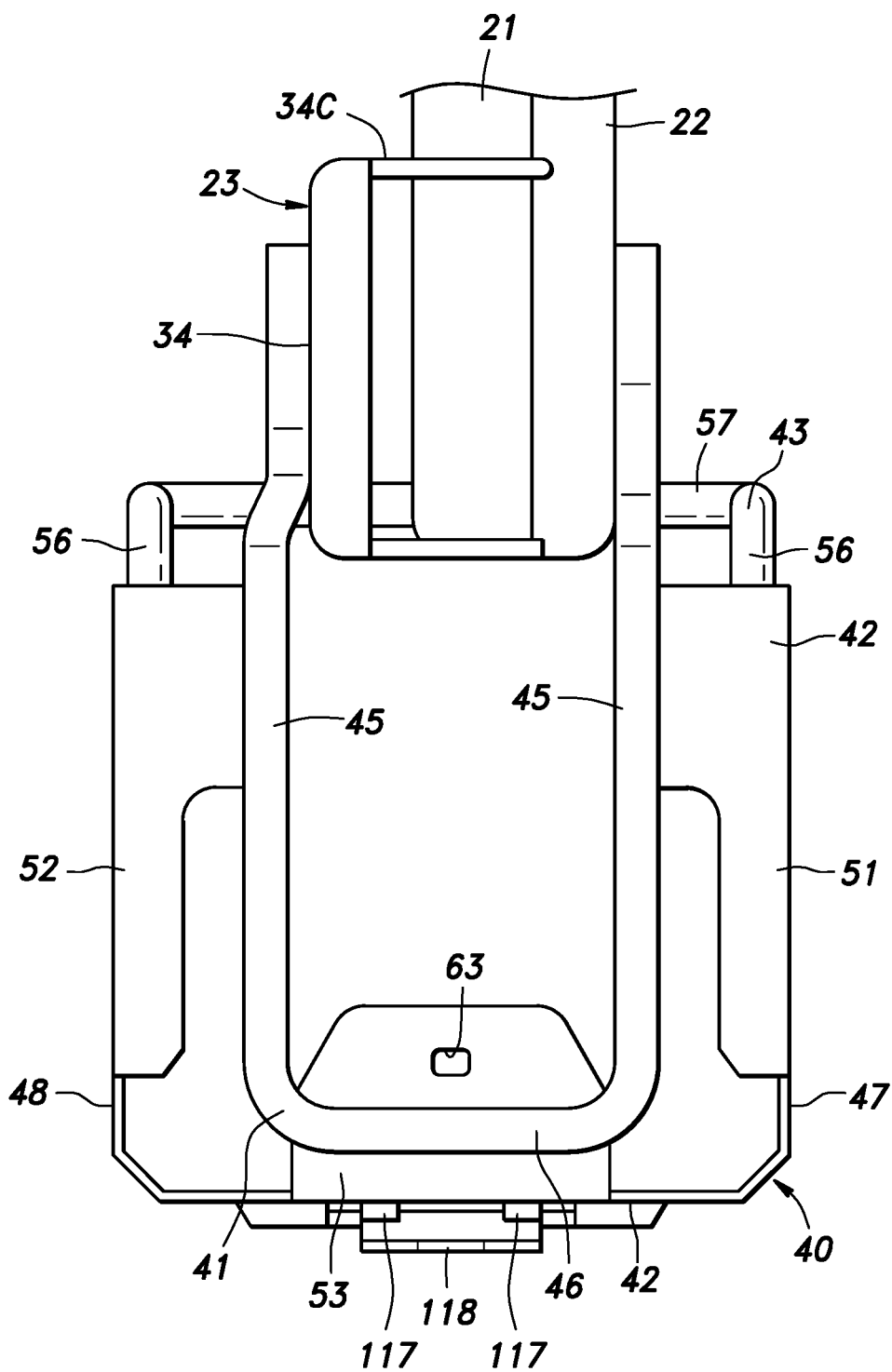
Figure 6:
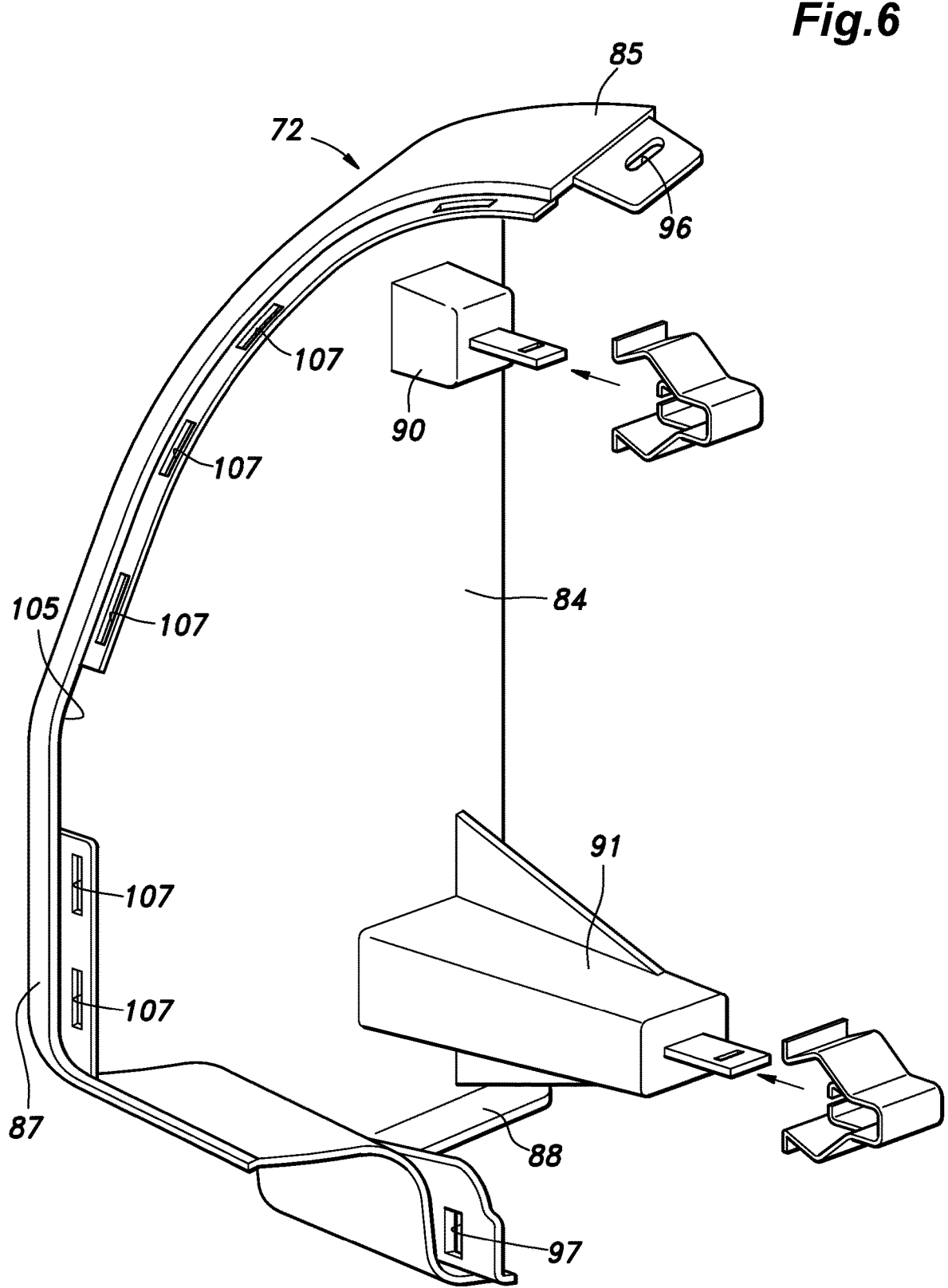
Figure 7:
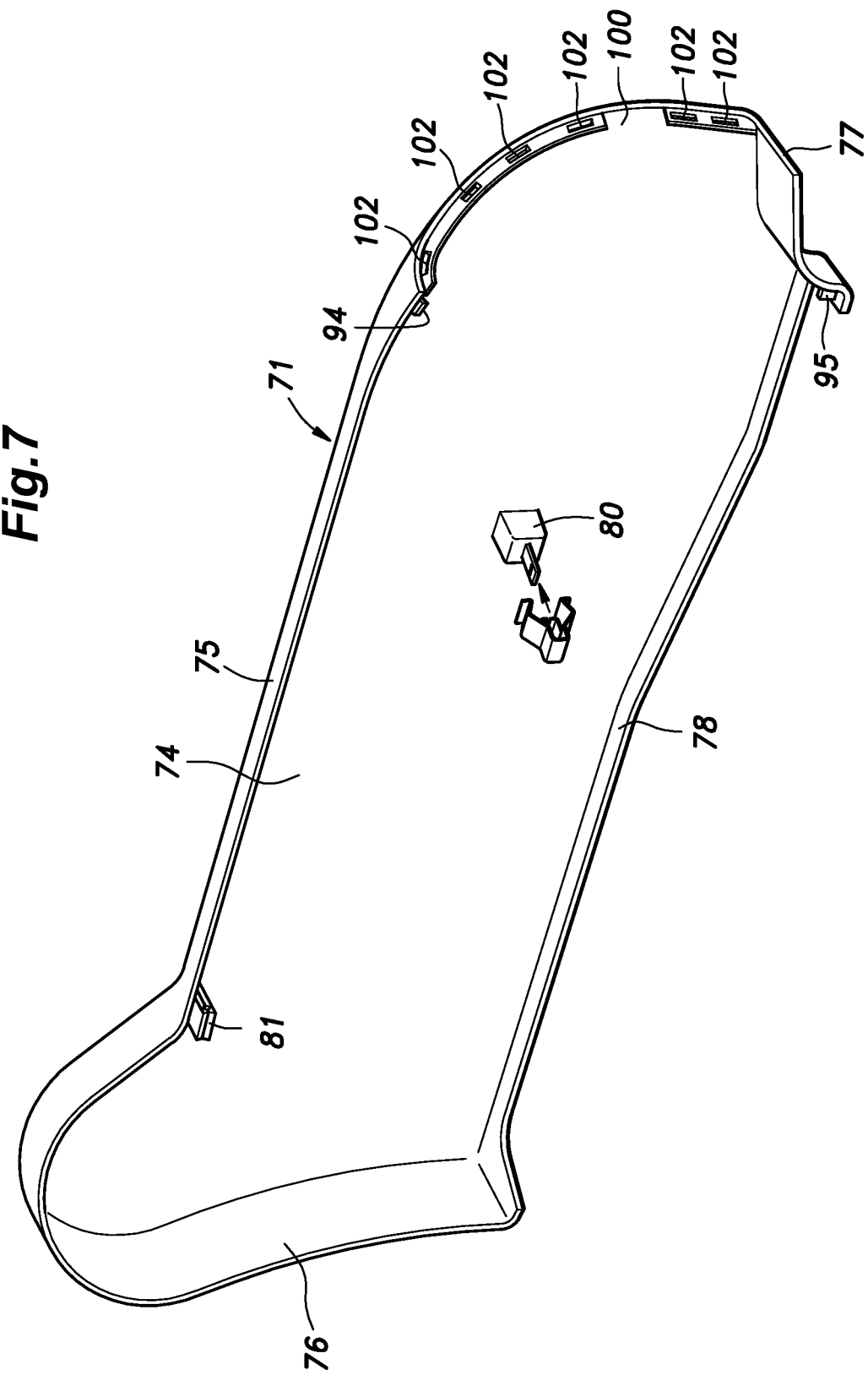
Figure 8:
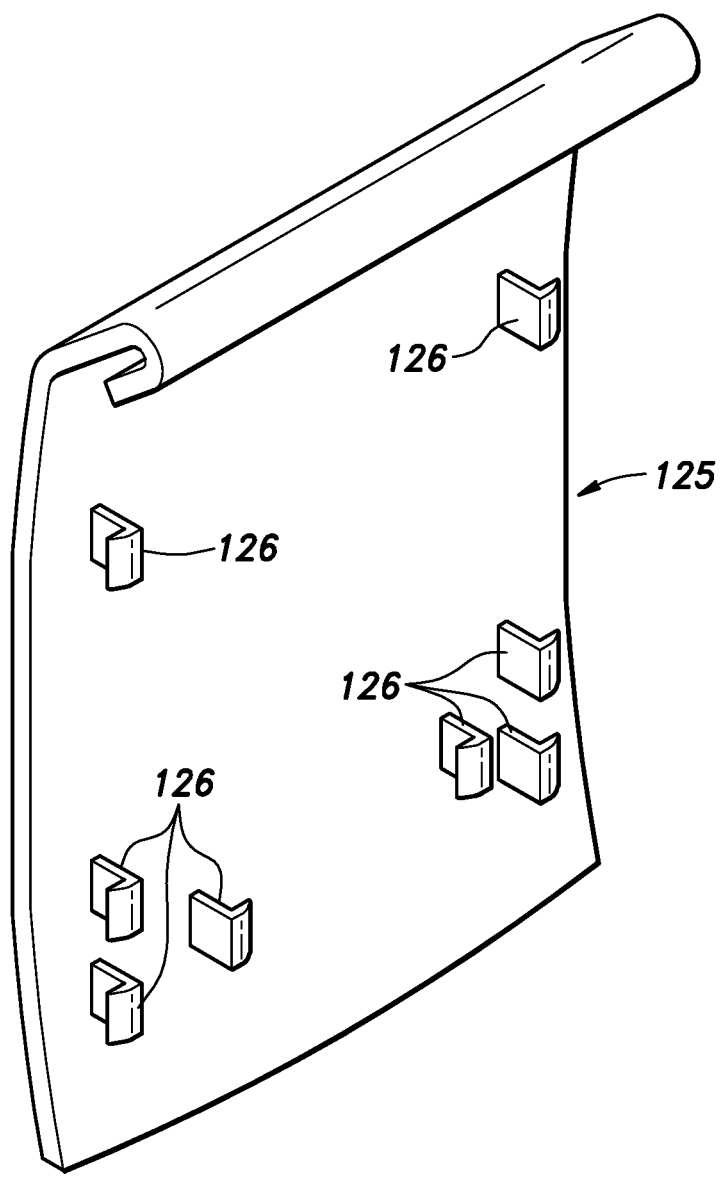
Figure 9:
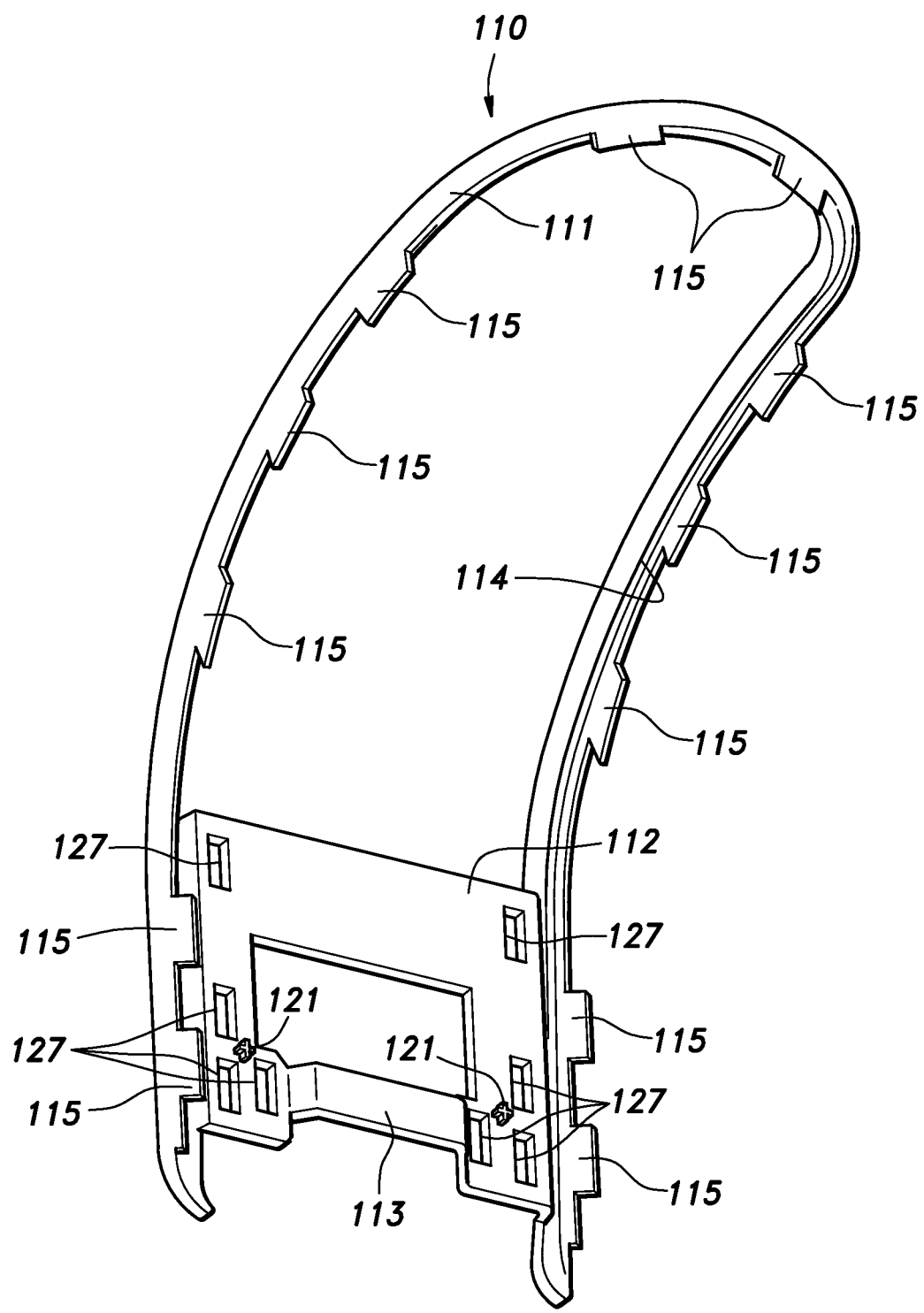
Figure 10:
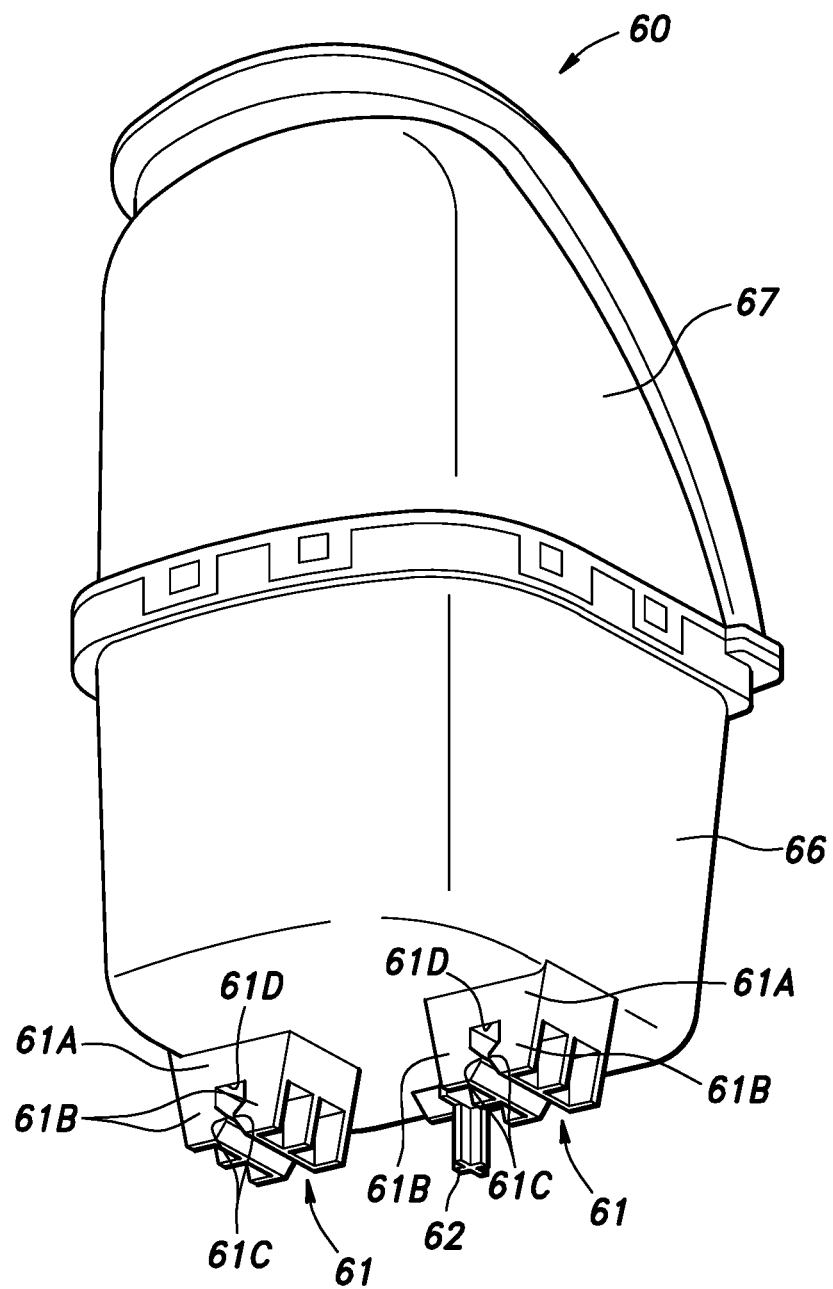
Figure 11:
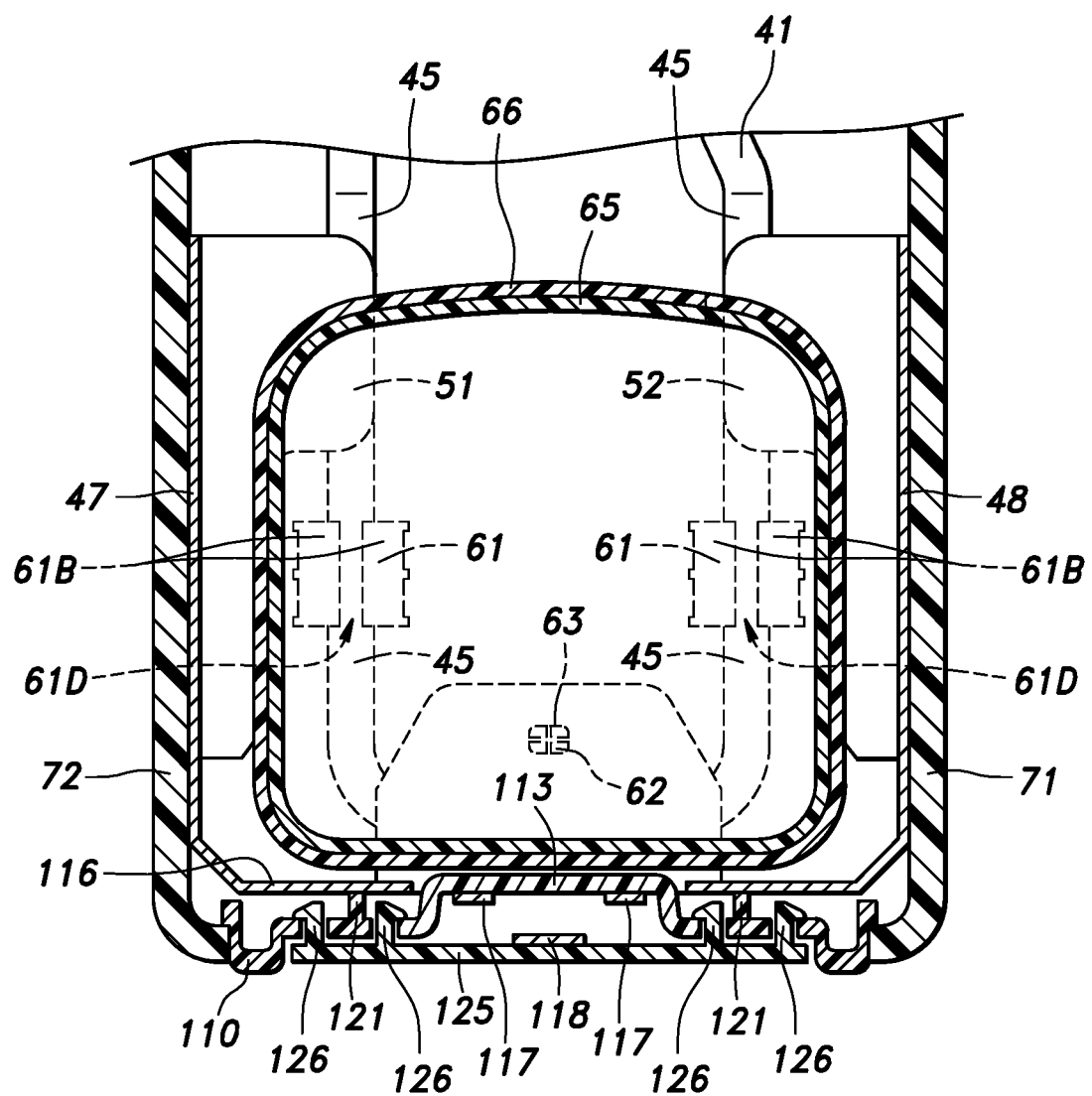
Figure 12:
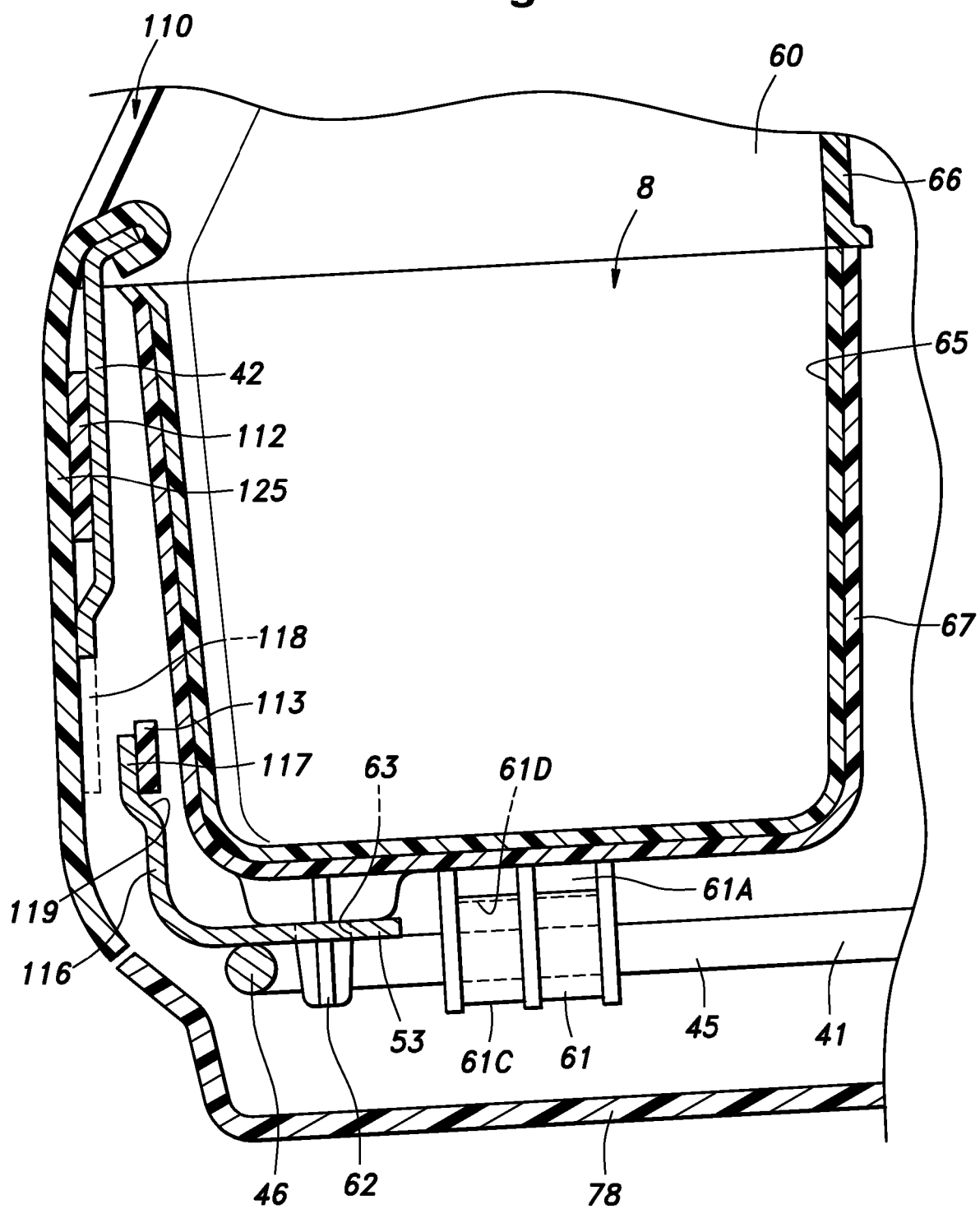
Figure 13:
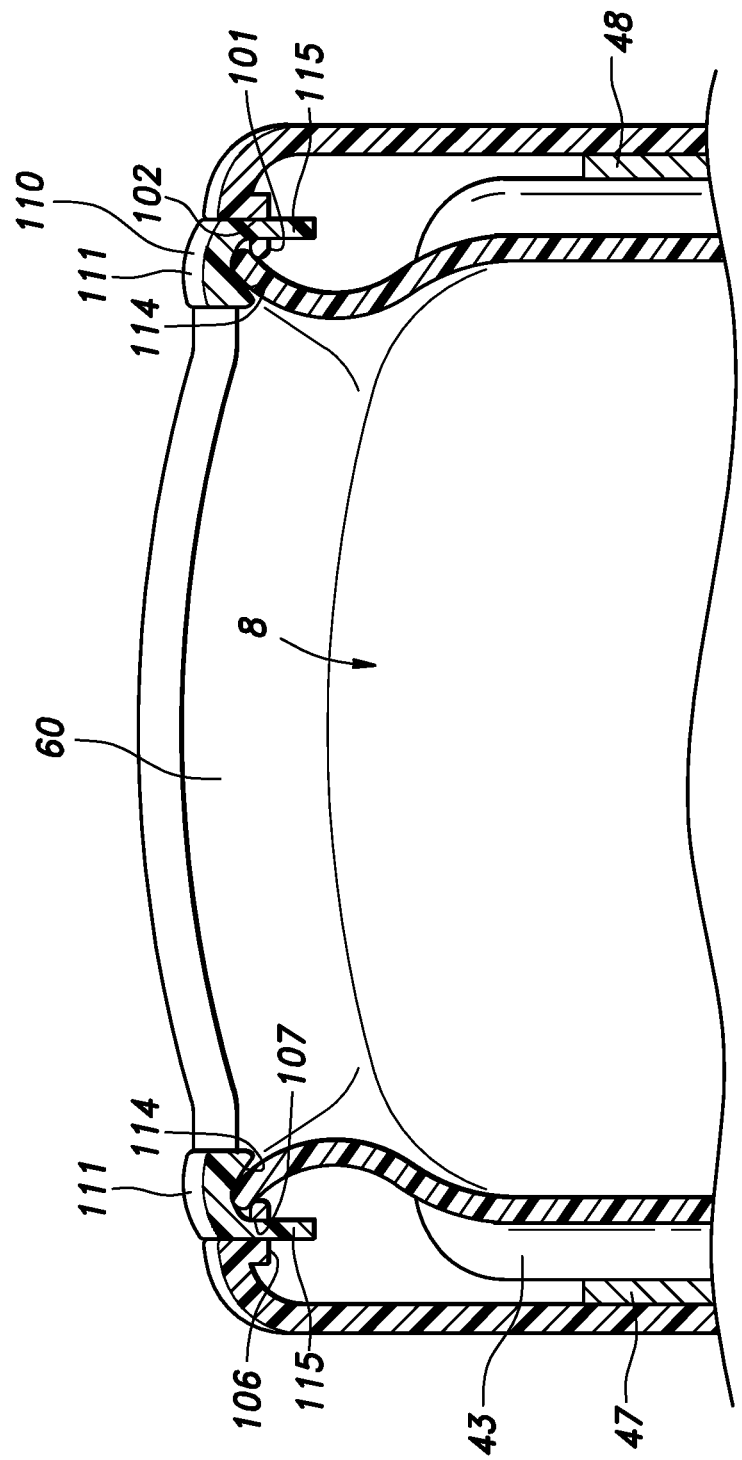

FIG. 1 is a perspective view of a vehicle seat according to an embodiment of the present invention;
FIG. 2 is a side view of a lower part of the vehicle seat;
FIG. 3 is a fragmentary enlarged view of a front end part of a reclining cover of the vehicle seat;
FIG. 4 is a fragmentary perspective view of a side frame and a sub frame;
FIG. 5 is a bottom view of the side frame and the sub frame;
FIG. 6 is a perspective view of an inner cover;
FIG. 7 is a perspective view of an outer cover;
FIG. 8 is a perspective view of a front cover;
FIG. 9 is a rear perspective view of a decorative member;
FIG. 10 is a rear perspective view of a container receiving member;
FIG. 11 is a sectional view taken long line XI-XI of FIG. 3;
FIG. 12 is a sectional view taken long line XII-XII of FIG. 3; and
FIG. 13 is a sectional view taken long line XIII-XIII of FIG. 3.

DESCRIPTION OF THE PREFERRED EMBODIMENT(S)

A preferred embodiment of the present invention is described in the following with reference to the appended drawings.
(Overall Structure)

As shown in FIG. 1, the vehicle seat 1 is arranged in the second row of a vehicle such as a minivan. The vehicle seat 1 is supported on a floor of a vehicle body so as to be movable in the fore and aft direction via a known seat slide mechanism. The vehicle seat 1 includes a seat cushion 2 provided on the floor of the vehicle via the seat slide mechanism, a seat back 3 pivotally connected to the rear end of the seat cushion 2, a headrest 4 provided at the upper end of the seat back 3, and an ottoman 5 that can be deployed and retracted from and onto the front end of the seat cushion 2.

The seat back 3 is rotatably coupled to the rear end of the seat cushion 2 via a per se known reclining mechanism R (see FIG. 2). The ottoman 5 is formed in a flat rectangular shape, and is connected to the seat cushion 2 via an ottoman operating mechanism (not shown in the drawings). The ottoman 5 can be selectively deployed forward of the seat cushion 2 by the ottoman operating mechanism, and is configured such that the upper surface thereof in the deployed condition extends continuously with the seat surface of the seat cushion 2 as indicated by the imaginary lines in FIG. 1 for supporting the feet of the seat occupant. In the retracted condition of the ottoman 5, the ottoman 5 is placed on the front end of the seat cushion 2 so that the feet supporting surface thereof faces forward as indicated by the solid lines in FIG. 1.

A reclining cover 6 is provided on either side of the seat cushion 2. The reclining cover 6 extends substantially over the entire fore and aft length of the seat cushion 2, and conceals the reclining mechanism R of the seat cushion 2 from view. The reclining cover 6 is provided with a lever (not shown in the drawings) for rotating the ottoman 5, a lever (not shown in the drawings) for adjusting the reclining angle of the seat back 3 with respect to the seat cushion 2.

A cup holder 7 is provided at the front end of the reclining cover 6 on the left hand side of the vehicle seat 1. The illustrated vehicle seat 1 is located on the right hand side of the vehicle body so that the cup holder 7 is located on the inboard side of the vehicle seat 1. In the case of the left hand side seat, the cup holder 7 would be located on the right hand side of the vehicle seat 1. The cup holder 7 defines a receiving recess 8 which opens forward and upward so as to accommodate a beverage container such as a plastic bottle or a drink can. As shown in FIG. 2, the front profile of the cup holder 7 is located behind the front profile of the ottoman 5 in the retracted position in side view. Thereby, in the vehicle seat 1 provided with the ottoman 5, the cup holder 7 is prevented from obstructing the occupant in getting into and out of the seat.

A lower part of the front end of the reclining cover 6 is formed with a cutout 9 which is recessed rearward. By providing the cutout 9, the occupant's legs are prevented from hitting the reclining cover 6 so that the reclining cover 6 is protected from damages, and the feet of the occupant are also protected.

(Seat Cushion)

As shown in FIG. 2, the seat cushion 2 includes a pair of side frames 11, a pair of movable members 13 mounted on the respective side frames 11 so as to be moveable in the fore and aft direction, and tiltable around a lateral axial line in synchronism with the reclining movement of the seat back 3 relative to the seat cushion 2, a pan frame P supported by the movable members 13, a pad member supported by the pan frame, and a skin material covering the pad member. The side frames 11 extend in the fore and aft direction, and constitute the side framework of the seat cushion 2. The front and rear ends of the left movable member 13 are pivotally connected to the left side frame 11 via a front link member 15 and a rear link member 16, respectively. Similarly, the front and rear ends of the right movable member 13 are pivotally connected to the right side frame 11 via a front link member 15 and a rear link member 16, respectively. The pan frame P is disposed between the side frames 11 and is supported by the movable members 13, and defines a supporting surface facing upward. A pad member made of a cushioning material such as urethane foam is placed on the upper surface of the pan frame P. A skin material formed of synthetic leather, cloth, or the like covers the upper surface of the pad member. In the illustrated embodiment, the moveable members 13, the front link members 15, and the rear link members 16 constitute a link mechanism configured to move the pan frame P in synchronism with a tilting motion of the seat back 3.

Each side frame 11 includes an outer frame part 21 and an inner frame part 22 each consisting of a plate member having a major plane facing sideway and extending in the fore and aft direction. The lower edges of the outer frame part 21 and the inner frame part 22 are bent toward each other into an overlapping relationship, and are welded to each other. A first bracket 23 is attached to a lower front part of the side frame 11, and extends downward. A second bracket 24 is attached to a lower edge of a middle part of the side frame 11.

The outer frame part 21 includes an outer frame main portion 26 extending in the fore and aft direction and an outer extension 27 extending upward from the front end of the outer frame main portion 26. The outer extension 27 pivotally supports the corresponding end of the front link member 15. A tongue piece 28 extends upward from the upper end of the outer extension 27, and is bent inward with respect to the vehicle seat.

The inner frame part 22 includes an inner frame main portion 30 extending in the front and rear direction and an inner extension 31 extending upward from the front end of the inner frame main portion 30. An upper end part of the inner extension 31 is formed with a first engagement slot 32 passed therethrough. The first engagement slot 32 is elongated in the fore and aft direction. The outer frame part 21 and the inner frame part 22 are joined together in suitable parts thereof in addition to the lower edges thereof.

A lower end part of the frame of the seat back 3 is pivotally connected to a rear end parts of the side frames 11 via the reclining mechanism R. An engagement portion 29 consisting of a loop of steel wire is attached to an upper edge part of a rear end part of the outer frame main portion 26 by welding or the like. The edges of the outer frame part 21 and the inner frame part 22 may be bent toward each other in some places thereof for reinforcement purpose although not shown in the drawings.

The first bracket 23 consists of a strip of steel plate extending in parallel with the outer frame main portion 26, and has a relatively small width in an upper part 33 thereof which is attached to the outer frame main portion 26, and a relatively large width in a lower part 34 thereof. The lower part 34 of the first bracket 23 includes a main part 34A having a major plane extending in parallel with the outer frame main portion 26, and a flange 34B that is bent inward from the side edge of the main part 34A as best shown in FIG. 4. A part of the flange 34B adjoining the lower edge of the outer frame main portion 26 is provided with a pair of extensions 34C (only one of them is shown in FIG. 4) extending along and welded to the lower surface of the side frame 11.

A second engagement slot 36 elongated in the fore and aft direction is passed through a lower part of the first bracket 23. A rectangular hole 37 is formed in a part of the first bracket 23 immediately above the second engagement slot 36 to reduce the weight of the first bracket 23.

The second bracket 24 consists of a strip of steel sheet extending laterally, and has a vertically facing major plane. The second bracket 24 is welded to the lower surfaces of the outer frame part 21 and the inner frame part 22 at a substantially middle part of the side frame 11 with respect to the fore and aft direction. The outer edge of the second bracket 24 projects outward from the outer frame part 21, and is bent upward to form an engagement portion 38 extending upward. The engagement portion 38 thus has a major plane facing laterally, and is formed with an engagement hole 39 passed therethrough.

(Sub Frame)

As shown in FIGS. 4 and 5, a sub frame 40 is attached to a front end part of the side frame 11. The sub frame 40 includes a support wire member 41 welded to the left and right side surfaces of the side frame 11 in the inboard side, a housing member 42 made of steel plate and positioned on the support wire member 41, and a protective wire member 43 welded to the upper end of the housing member 42.

The support wire member 41 is formed by bending a single metal bar having a circular cross section into a U shape as seen from the top with the two-pronged ends directed rearward, and a pair of longitudinal portions 45 extending in the fore and aft direction in a laterally spaced apart relationship, and a cross portion 46 extending between the front ends of the longitudinal portions 45. The two-pronged based ends of the support wire member 41 are welded to either side of a front end part of the side frame 11. In the present embodiment, the base end (rear end) of one of the longitudinal portions 45 on the outer side of the seat is welded to the outer side surface of the main part 34A of the lower part 34 of the first bracket 23 which is in turn welded to the outer side of the outer frame part 21. This longitudinal portion 45 extends forwardly and downwardly from the base end thereof, and is provided with a free end part extending forward and substantially horizontally. The base end (rear end) of the other longitudinal portion 45 on the inner side of the seat is welded to the inner side surface of the inner frame part 22. This longitudinal portion 45 also extends forwardly and downwardly from the base end thereof, and is provided with a free end part extending forwardly and substantially horizontally. The two longitudinal portions 45 are configured such that the cross portion 46 extends horizontally between the free ends of the two longitudinal portions 45. Thus, the front parts of the longitudinal portions 45 and the cross portion 46 jointly define a rectangular and horizontal support surface S. The base end of one of the longitudinal portions 45 may also be directly welded to the outer side of the outer frame part 21, instead of being attached thereto via the first bracket 23.

The housing member 42 is formed by blanking and bending steel sheet. The housing member 42 includes a pair of side walls 47 and 48 both extending in the fore and aft direction and the vertical direction, and a front wall 49 connected between the front edges of the side walls 47 and 48 and extending in the lateral direction and the vertical direction. The rear edges of the side walls 47 and 48 are laterally spaced from the respective opposing surfaces of the outer frame part 21 and the inner frame part 22.

The lower edges of the side walls 47 and 48 are at least partly bent toward each other to form linear side flanges 51 and 52. The lower edge of the front wall 49 is bent rearward to form a linear front flange 53. The linear side flanges 51 and 52 of the side walls 47 and 48 are placed on and welded to the respective longitudinal portions 45 while the linear front flange 53 of the front wall 49 is placed on and welded to the cross portion 46. The housing member 42 is thus supported by the support wire member 41 from below along the three sides.

The protective wire member 43 is formed by bending a single metal bar having a circular cross section in a substantially U shape in front view with the two-pronged end directed downward. The protective wire member 43 thus includes a pair of vertical portions 56 having two base ends (lower ends) thereof welded to the inner sides of the two side walls 47 and 48, and a lateral portion 57 extending horizontally and laterally between the upper ends of the vertical portions 56. Thus, the vertical portions 56 extend vertically in a mutually spaced apart, and parallel relationship. A laterally middle part of the lateral portion 57 is welded to the horizontal free end part of the tongue piece 28.

(Container Receiving Member)

A container receiving member 60 as best shown in FIG. 10 is received in the housing member 42. The container receiving member 60 consists of a vertically elongated shell made of suitable plastic material and having an open upper end, and defines the receiving recess 8 therein to receive a beverage container (such as a plastic bottle, a beverage can, etc.) therein.

As shown in FIG. 10, a pair of engagement portions 61 project downward from the bottom surface of the container receiving member 60 laterally one next to each other in spaced apart relationship. The engagement portions 61 each include a base portion 61A protruding in a substantially trapezoid shape when viewed from the front, and a pair of side jaws 61B protruding downward from the side edge parts of the base portion 61A. The opposing surfaces of the side jaws 61B are provided with claws 61C projecting toward each other so that an engagement recess 61D extending in the fore and aft direction is defined between the opposing surfaces of the side jaws 61B. The lower end of the engagement recess 61D is narrowed owing to the presence of the claws 61C. As shown in FIG. 12, the longitudinal portions 45 of the support wire member 41 are engaged by the engagement recesses 61D of the respective engagement portions 61. The claws 61C allow the longitudinal portions 45 to be snap fitted into the engagement recess 61D during the assembly process, but prevents the longitudinal portions 45 from being inadvertently dislodged from the engagement recess 61D during use. This engagement structure positively prevents the lateral movement and the vertical movement of the container receiving member 60 relative to the support wire member 41.

A stopper 62 consisting of a protrusion protrudes downward from a laterally central part of a front edge part of the bottom surface of the container receiving member 60. The stopper 62 is located ahead of the engagement portions 61, and has a cross-shaped cross section. As shown in FIG. 5, the linear front flange 54 of the housing member 42 is formed with a locating hole 63, and the stopper 62 is fitted into the locating hole 63. The stopper 62 thus prevents the container receiving member 60 from moving in the lateral direction and the fore and aft direction in cooperation with the locating hole 63. Thus, the container receiving member 60 is fixedly secured in position relative to the side frame 11.

As shown in FIG. 12, the container receiving member 60 includes a cup-shaped lower member 67 that opens upward, and a tubular upper member 66 joined to the upper edge of the lower member 67, and the upper member 66 and the lower member 67 are both made by injection molding hard plastic material. The inner surface of the lower member 67 is covered by an inner lining 65 made of soft plastic material such as olefinic elastomer. By providing the inner lining 65 on the container receiving member 60, the beverage container is protected from damages that could be otherwise caused by the vibration of the vehicle body or the like. Also, since the vibration of the beverage container is absorbed by the inner lining 65, the content of the beverage container is prevented from spilling that could be otherwise caused by the vibration of the vehicle body.

(Reclining Cover)

As shown in FIG. 3, the reclining cover 6 includes an outer cover 71 covering the sub frame 40 and the side frame 11 from outside, and extending substantially over the entire fore and aft length of the side frame 11 and the sub frame 40, and an inner cover 72 covering the sub frame 40 and a front end part of the side frame 11 from inside.

As shown in FIG. 7, the outer cover 71 includes an outer panel part 74 forming the outer side part of the outer cover 71, an upper panel part 75 extending inward from the upper edge of the outer panel part 74, a rear panel part 76 extending inward from the rear edge of the outer panel part 74, a front panel part 77 extending inward from the front edge of the outer panel part 74, and a lower panel part 78 extending inward from the lower edge of the outer panel part 74.

The inner side of the outer panel part 74 is provided with a first coupling portion 80 consisting of a horizontally extending tongue piece projecting from a central part thereof, and a second coupling portion 81 also consisting of a horizontally extending tongue piece projecting from an upper edge of a rear end part of the outer panel part 74. The first coupling portion 80 is engaged by the engagement hole 39 of the second bracket 24 via a clip fitted on the first coupling portion 80. The second coupling portion 81 is engaged by the engagement portion 29 provided on the outer side of the outer frame part 21. The outer panel part 74 is thus attached to the outer frame part 21 via the first coupling portion 80 and the second coupling portion 81.

As shown in FIG. 6, the inner cover 72 is provided with a contour corresponding to that of a front end part of the outer cover 71, and extends along the inner side of the side frame 11. The inner cover 72 includes a plate-like main panel part 84 having a laterally facing major plane, an upper panel part 85 extending outward from the upper edge of the main panel part 84, a front panel part 87 extending outward from the front edge of the main panel part 84, and a lower panel part 88 extending outward from the lower edge of the main panel part 84.

A third coupling portion 90 and a fourth coupling portion 91 project outward (or toward the side frame 11) from an upper and a lower part of a rear end part of the main panel part 84. The third coupling portion 90 is fitted with a clip similarly as the first coupling portion 80, and is fitted into the first engagement slot 32 provided in an upper part of the inner extension 31 of the inner frame part 22. The fourth coupling portion 91 is also fitted with a clip similarly as the first coupling portion 80, and is fitted into the second engagement slot 36 provided in the first bracket 23. The inner cover 72 is thus attached to the inner frame part 22 via the third coupling portion 90 and the fourth coupling portion 91.

As shown in FIG. 7, a front end part of the upper panel part 75 is provided with an engagement claw 94 projecting downward, and a lower end part of the front panel part 77 is provided with a similar engagement claw 95 projecting upward. As shown in FIG. 6, a free end part (inner end part) of the upper panel part 85 of the inner cover 72 is provided with an engagement hole 96 configured to receive the engagement claw 94, and a lower end part of the front panel part 87 is provided with an engagement hole 97 configured to receive the engagement claw 95. By thus engaging the engagement claws 94 and 95 with the engagement holes 96 and 97, respectively, the front panel part 77 of the outer cover 71 is joined to the front panel part 87 of the inner cover 72.

The front panel part 77 of the outer cover 71 defines a front edge of the outer cover 71. The front panel part 77 is provided with a plurality of engagement holes 102 arranged along the length of the front panel part 77.

As shown in FIG. 6, the front panel part 87 of the inner cover 72 defines a front edge 105 of the inner cover 72. The front panel part 87 is provided with a plurality of engagement holes 107 arranged along the length of the front panel part 87. The front edge 100 of the inner cover 72 and the front edge 105 of the outer cover 71 jointly define an opening 108 of a recess that receives the sub frame 40 as well as the container receiving member 60 received in the sub frame 40.

(Decorative Member)

A decorative member 110 extending along the peripheral edge of the opening 108 is attached to the front edges of the inner cover 72 and the outer cover 71. As shown in FIG. 9, the decorative member 110 includes a frame part 111 having an inverted U shape, and curving in conformity with the profile of the opening 108, and a plate part 112 having a rectangular shape and extending between the lower leg parts of the frame part 111. The plate part 112 is formed with a rectangular opening in a lower part thereof so that a cross piece 113 defines the lower edge of the rectangular opening and the lower edge of the plate part 112. The cross piece 113 is generally offset rearward relative to the remaining part of the plate part 112, and is generally in parallel with the remaining part of the plate part 112.

As shown in FIG. 3, the frame part 111 extends along the lateral edges and the rear (upper) edge of the opening 108 so that the gap that may exist between the periphery of the opening 108 and the upper opening edge of the container receiving member 60 may be concealed from view, and the external appearance of the front end part of the reclining cover 6 or the cup holder 7.

As shown in FIGS. 9 and 13, the frame part 111 is provided with a groove 114 extending along the length of the frame part 111 on the rear side thereof, and a plurality of tongue pieces 115 projecting rearward from the outer edge of the frame part 111 and arranged along the length thereof. The groove 114 loosely receives the upper edge of the container receiving member 60 defining the open top thereof, and the tongue pieces 115 are received in the engagement holes 102 of the front panel part 77 of the outer cover 71 and the engagement holes 107 of the front panel part 87 of the inner cover 72 so that the frame part 111 is firmly attached to the outer cover 71 and the inner cover 72. The outer side of the frame part 111 abuts an opposing front edges of the outer frame part 21 and the inner frame part 22. Since the edge of the container receiving member 60 is received in the groove 114 in a slightly moveable manner, any positional error that may exist between the container receiving member 60 and the decorative member 110 can be favorably accommodated.

As shown in FIGS. 11 and 12, the plate part 112 of the decorative member 110 extends along the front wall 49 of the housing member 42. As shown in FIG. 4, the front wall 49 includes a main body 116 facing forward and defining a central opening, a pair of engagement pieces 117 extending upward from the lower edge of the central opening into the central opening in a laterally spaced apart relationship, a retaining piece 118 extending downward from the upper edge of the central opening into the central opening (in particular, into a space defined between the engagement pieces 117 in front view). As shown in FIG. 12, the upper ends of the engagement pieces 117 are located above the lower end of the retaining piece 118. The upper part of each engagement piece 117 is offset forward relative to the lower part thereof in a mutually parallel relationship so that an upwardly facing shoulder surface 119 is defined on the rear side of each engagement piece 117. The engagement pieces 117 and the retaining piece 118 are formed by punching out the central opening, and suitably bending the corresponding pieces when forming the front wall 49 of the housing member 42 from steel sheet.

As shown in FIG. 12, the cross piece 113 of the decorative member 110 is engaged by the engagement pieces 117. In particular, the cross piece 113 is located behind the engagement pieces 117 while the remaining part of the plate part 112 of the decorative member 110 is located in front of the main body 116 of the front wall 49. The lower edge of the cross piece 113 rests upon the shoulder surfaces 119 of the engagement pieces 117. Therefore, the plate part 112 of the decorative member 110 is secured against the downward movement and lateral movement thereof relative to the housing member 42.

As shown in FIG. 9, the plate part 112 of the decorative member 110 further includes a pair of protrusions 121 protruding rearward on either outer side of the central opening or the cross piece 113. The protrusions 121 abut the front surface of the front wall 49 of the housing member 42 at the free ends thereof. Further, the rear surface of the cross piece 113 is in contact with the two engagement pieces 117. As a result, the movement of the decorative member 110 in the fore and aft direction and the lateral direction is restricted, and the vertical movement of the decorative member 110 is restricted by the friction between the decorative member 110 and the front wall 49 of the housing member 42. As a result, the decorative member 110 is firmly attached to the front wall 49 of the housing member 42.

(Front Cover)

A front cover 125 made of hard plastic plate member is attached to the front side of the plate part 112 of the decorative member 110. As shown in FIG. 8, the front cover 125 has a substantially rectangular plate shape corresponding to the plate part 112 of the decorative member 110. The rear side of the front cover 125 is provided with a plurality of engagement claws 126, and corresponding engagement holes 127 are formed in the plate part 112 of the decorative member 110 so that the front cover 125 can be fixedly attached to the decorative member 110 by snap fitting the engagement claws 126 into the respective engagement holes 127.

As shown in FIG. 12, the upper edge of the front wall 49 of the housing member 42 is bent rearward. The upper edge of the front cover 125 is wrapped around the upper edge of the front wall 49. In particular, the upper edge of the front cover 125 is located above the adjacent upper edge of the container receiving member 60 so that the front cover 125 is effective in preventing the forward tilting of the beverage container received in the container receiving member 60. Since the front cover 125 is made of plastic material, as opposed to the housing member 42 which is made of steel sheet, the beverage container can be supported in a resilient manner.

The lower edge of the front cover 125 is located higher than the lower edges of the outer cover 71 and the inner cover 72. The lower parts of the front edges of the outer cover 71 and the inner cover 72 (which are located immediately below the lower edge of the front cover 125) are recessed rearward with respect to remaining parts of the outer cover 71 and the inner cover 72 so that the cutout 9 is formed in the lower part of the front end of the reclining cover 6 as mentioned earlier.

The procedure for assembling the reclining cover 6, the decorative member 110 and the front cover 125 is described in the following. Initially, the support wire member 41 and the protective wire member 43 are welded to the housing member 42, and then to the side frame 11. The container receiving member 60 is placed in the housing member 42, and the engagement portions 61 are engaged by the longitudinal portions 45 of the support wire member 41 while the stopper 62 is fitted into the locating hole 63 formed in the linear front flange 54 of the housing member 42. The inner cover 72 is then attached to the inner side of the side frame 11 by fitting the third coupling portion 90 and the fourth coupling portion 91 into the first engagement slot 32 at the upper portion of the inner frame part 22 and the second engagement slot 36 of the first bracket 23, respectively. The outer cover 71 is attached to the outer side of the side frame 11 by fitting the first coupling portion 80 into the third engagement hole 39 of the second bracket 24, and engaging the second coupling portion 81 with the engagement portion 29 of the outer frame part 21. Since the reclining cover 6 is formed by the two parts or the outer cover 71 and the inner cover 72, the assembling of the reclining cover 6 is simplified.

The front edges of the outer cover 71 and the inner cover 72 jointly define the opening 108.

The cross piece 113 of the plate part 112 of the decorative member 110 is passed under the lower end of the retaining piece 118, and by lifting the plate part 112 slightly upward, is passed above the upper ends of the engagement pieces 117. The plate part 112 is then moved downward until the cross piece 113 rests upon the shoulder surfaces 119 of the engagement pieces 117. At this time, the protrusions 121 of the plate part 112 abut upon the front surface of the front wall 49 of the housing member 42. Further, the tongue pieces 115 of the frame part 111 of the decorative member 110 are fitted into the engagement holes 102 of the front panel part 77 of the outer cover 71 and the engagement holes 107 of the front panel part 87 of the inner cover 72 while the edge of the upper opening of the container receiving member 60 is received in the groove 114 of the frame part 111 of the decorative member 110. Finally, the engagement claws 126 of the front cover 125 are fitted into the corresponding engagement holes 127 of the plate part 112 of the decorative member 110.

The advantages of the vehicle seat 1 configured as described above are discussed in the following. The container receiving member 60 is engaged by the support wire member 41, and the support wire member 41 is welded or otherwise fixedly secured to the side frame 11. Therefore, the container receiving member 60 can be firmly secured to the side frame 11 via the support wire member 41.

In the illustrated embodiment, since the container receiving member 60 is received in the housing member 42 which is in turn welded or otherwise fixedly secured to the support wire member 41, the container receiving member 60 is particularly favorably protected from external loading.

In the illustrated embodiment, since the housing member 42 is connected to the tongue piece 28 of the outer extension 27 of the outer frame part 21 via the protective wire member 43, the container receiving member 60 is particularly favorably protected from external loading. The outer extension 27 is designed for pivotally supporting the link member 15, and hence extends upward so that the housing member 42 can be particularly favorably supported by the side frame 11 via the protective wire member 43 and the support wire member 41 at vertically spaced apart parts thereof.

In the illustrated embodiment, since the longitudinal portions 45 are connected to either side of the side frame 11 so that the side frame 11 is prevented from being subjected to an undue moment when an excessive loading is applied to the container receiving member 60.

Since main parts of the longitudinal portions 45 are downwardly offset relative to the respective base ends of the longitudinal portions 45, and extend substantially horizontally, the container receiving member 60 can be positioned in a relatively low part of the seat cushion 2 so that the cup holder 7 can retain a beverage container at a height which is convenient for the seat occupant.

Since the cup holder further includes a protective wire member 43 including a pair of vertical portions 56 having lower ends attached to the respective side walls of the housing member, and a lateral portion 57 extending between upper ends of the vertical portions, the lateral portion being fixedly attached to an upper extension (outer extension 27 and inner extension 28) of the corresponding side frame, the container receiving member 60 can be secured to the side frame 11 in an even more firm manner.

Since the vehicle seat is provided with a pan frame P which is supported by the side frames via a link member 15 configured to move the pan frame P in synchronism with a tilting motion of the seat back 3, the inner extension 31 and the outer extension 27 of the side frame 11 being provided with a pivot point for the link mechanism, the protective wire member 43 may consist of a highly compact member, and can be attached to the side frame 11 in a highly firm manner.

Since the front flange 53 is formed in the lower edge of the front wall 49, the front flange 53 resting on the cross portion 46 of the support wire member 41, the container receiving member 60 can be secured to the side frame 11 in an even more stable manner.

Since the side frame includes an outer frame part 21 consisting of a sheet member having a major plane facing sideways, and an inner frame part 22 also consisting of a sheet member having a major plane facing sideways and attached to an inner side of the outer frame part, the outer side wall of the housing member being located more outward than the outer frame part, and the inner side wall of the housing member being located more inward than the inner frame part, the side frame 11 is given with a high bending stiffness by using a minimum amount of material, and is enabled to support the cup holder 7 in a highly stable manner.

Since a lateral center of the housing member is offset inward relative to a lateral center of the side frame, the housing member 42 or the cup holder 7 can be prevented from unduly protruding laterally from the side frame 11 so that the seat occupant is prevented from being obstructed by the cup holder 7 when getting seated in or unseated from the vehicle seat 1.

The vehicle seat further comprises a retractable ottoman 5 on a front side of the seat cushion, a front profile of the cup holder 7 being located behind a front profile of the ottoman 5 in a retracted state of the ottoman 5 in side view so that the cup holder 7 can be positioned so as to be least obtrusive to the seat occupant.

The vehicle seat further comprises an outer cover 71 covering an outer side of the side frame 11, an inner cover 72 covering a front part of an inner side of the side frame, a front cover 125 extending between front edges of the outer cover and the inner cover, an opening exposing the open top of the container receiving member 60 being defined by the front edges of the outer cover 71 and the inner cover 72 and an upper edge of the front cover 125 so that a cover for covering the side frame 11 and the reclining mechanism R can be formed in a highly simple manner, and the external appearance of the seat 1 can be enhanced. Furthermore, the assembling of the cover is simplified.

The vehicle seat further comprises a decorative member 110 including a frame part 111 extending along the front edges of the outer cover 71 and the inner cover 72, and a plate part 112 extending between lower ends of the frame part 111 and interposed between the front wall 49 of the housing member 42 and the front cover 125 so that the frame part 111 covers the upper edge of the container receiving member 60, and conceals a gap that may be created between the upper edge of the container receiving member 60 and the front edges of the inner cover 72 and the outer cover 71. The external appearance of the cup holder 7 can be thereby enhanced.

Since the plate part 112 of the decorative member 110 is provided with a cross piece 113 engaged by the engagement pieces 117 projecting upward from a part of the front wall 49 of the housing member 42, and the front cover 125 is attached to the plate part 112 via a snap fit arrangement 126, 127, the decorative member 110 and the front cover 125 can be attached to the side frame 11 both easily and firmly.

Since the lower parts of the front edges of the outer cover 71 and the inner cover 72 are recessed rearward with respect to remaining parts of the outer cover 71 and the inner cover 72, the reclining cover formed by the outer cover 71 and the inner cover 72 is prevented from hindering the seat occupant getting into and out of the seat.

Since the upper edge of the front wall 49 is bent rearward above a lower edge of the open top of the container receiving member 60, and an upper edge of the front cover 125 is wrapped around the upper edge of the front wall 49, the beverage container received in the container receiving member 60 is prevented from tilting forward in an effective manner. The upper edge of the front cover 125 enhances the external appearance of the open top of the container receiving member 60.

Since at least a bottom part of the container receiving member 60 is provided with an inner lining 65 made of relatively soft material, the beverage container received in the container receiving member 60 is protected from damages, and is prevented from rattling therein.

Although the present invention has been described in terms of a specific embodiment, the present invention is not limited by such an embodiment, but can be modified and substituted in various ways without departing from the spirit of the present invention. For instance, the container receiving member 60 may be provided on the rear end or on a side of the side frame 11 via an appropriately adapted sub frame 40.

The invention claimed is:

1. A vehicle seat including a seat cushion and a seat back connected to a rear end of the seat cushion via a reclining mechanism, comprising:
   a pair of side frames extending along either side of the seat cushion; and
   a cup holder provided in a front end part of one of the side frames;
   wherein the cup holder includes
   a support wire member including a pair of longitudinal portions having base ends attached to either side of the corresponding side frame and extending in a forward direction, and a cross portion extending between free ends of the longitudinal portions,
   a housing member having a pair of side walls, a front wall extending between front edges of the side walls, and side flanges formed in lower edges of the side walls, the side flanges resting on the longitudinal portions of the support wire member, and
   a cup shaped container receiving member having an open top and received in the housing member, a bottom end of the container receiving member being provided with a pair of engagement features that are engaged by the longitudinal portions of the support wire member.

2. The vehicle seat as defined in claim 1, wherein main parts of the longitudinal portions are downwardly offset relative to the respective base ends of the longitudinal portions, and extend substantially horizontally.

3. The vehicle seat as defined in claim 1, wherein the cup holder further includes a protective wire member including a pair of vertical portions having lower ends attached to the respective side walls of the housing member and extending upward, and a lateral portion extending between upper ends of the vertical portions, the lateral portion being fixedly attached to an upper extension of the corresponding side frame.

4. The vehicle seat as defined in claim 3, wherein the vehicle seat is provided with a pan frame which is supported by the side frames via a link mechanism configured to move the pan frame in synchronism with a tilting motion of the seat back, the upper extension of the side frame provided with the cup holder being provided with a pivot point for the link mechanism.

5. The vehicle seat as defined in claim 1, wherein a front flange is formed in a lower edge of the front wall, the front flange resting on the cross portion of the support wire member.

6. The vehicle seat as defined in claim 1, wherein the side frame provided with the cup holder includes an outer frame part consisting of a sheet member having a major plane facing sideways, and an inner frame part also consisting of a sheet member having a major plane facing sideways and attached to an inner side of the outer frame part, the outer side wall of the housing member being located more outward than the outer frame part, and the inner side wall of the housing member being located more inward than the inner frame part.

7. The vehicle seat as defined in claim 6, wherein a lateral center of the housing member is offset inward relative to a lateral center of the side frame provided with the cup holder.

8. The vehicle seat as defined in claim 1, further comprising a retractable ottoman on a front side of the seat cushion, a front profile of the cup holder being located behind a front profile of the ottoman in a retracted state in side view.

9. The vehicle seat as defined in claim 1, further comprising an outer cover covering an outer side of the side frame provided with the cup holder, an inner cover covering a front part of an inner side of the side frame, and a front cover extending between front edges of the outer cover and the inner cover, an opening exposing the open top of the container receiving member being defined by the front edges of the outer cover and the inner cover and an upper edge of the front cover.

10. The vehicle seat as defined in claim 9, further comprising a decorative member including a frame part extending along the front edges of the outer cover and the inner cover, and a plate part extending between lower ends of the frame part and interposed between the front wall of the housing member and the front cover.

11. The vehicle seat as defined in claim 10, wherein the plate part of the decorative member is provided with a cross piece engaged by a tongue piece projecting upward from a part of the front wall of the housing member, and the front cover is attached to the plate part via a snap fit arrangement.

12. The vehicle seat as defined in claim 9, wherein lower parts of the front edges of the outer cover and the inner cover are recessed rearward with respect to remaining parts of the front edges of the outer cover and the inner cover.

13. The vehicle seat as defined in claim 9, wherein an upper edge of the front wall is bent rearward above a front edge of the open top of the container receiving member, and the upper edge of the front cover is wrapped around the upper edge of the front wall.

14. The vehicle seat as defined in claim 1, wherein at least a bottom part of the container receiving member is provided with an inner lining made of relatively soft material.

* * * * *